Feb. 25, 1969   C. W. MOONEY   3,430,171
ELECTROMECHANICAL FREQUENCY RESPONSIVE TRANSLATING DEVICE
Filed Jan. 30, 1967
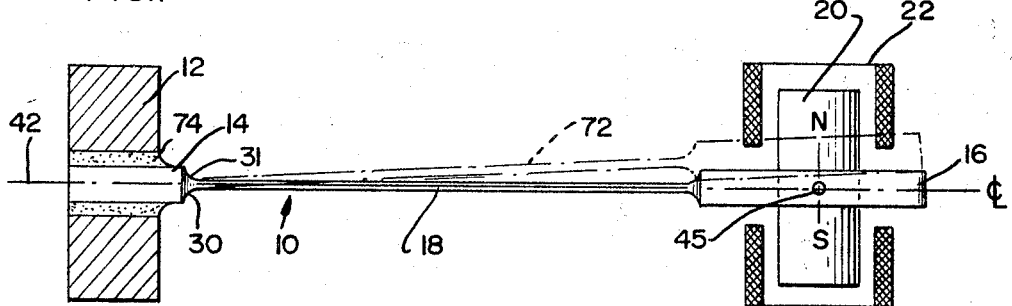
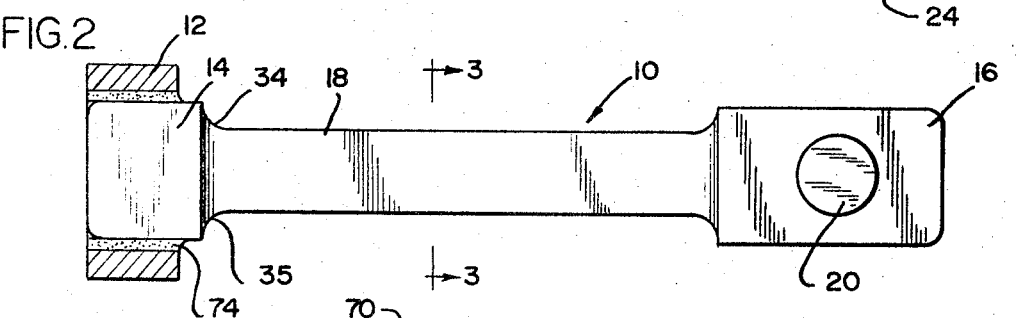
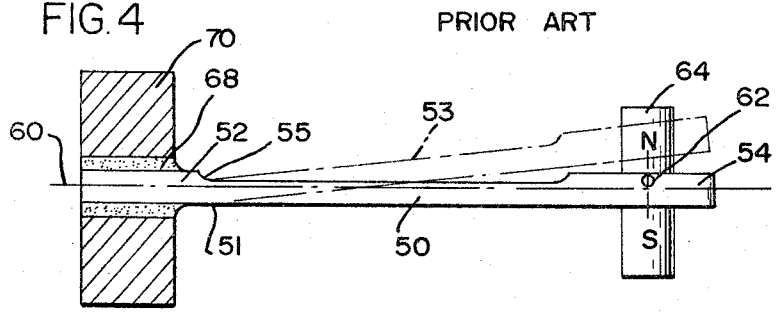
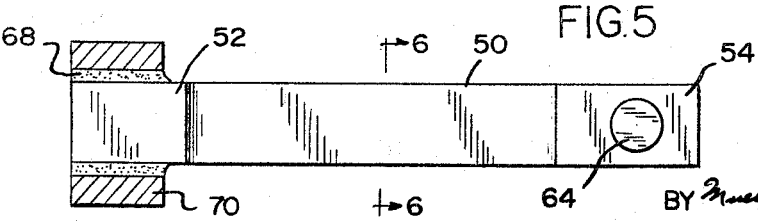
INVENTOR
CHARLES W. MOONEY
BY Mueller, Aichele & Rauner
ATTORNEYS.

United States Patent Office 3,430,171
Patented Feb. 25, 1969

3,430,171
ELECTROMECHANICAL FREQUENCY RESPONSIVE TRANSLATING DEVICE
Charles W. Mooney, Wheeling, Ill., assignor to Motorola, Inc., Franklin Park, Ill., a corporation of Illinois
Filed Jan. 30, 1967, Ser. No. 612,599
U.S. Cl. 335—252     7 Claims
Int. Cl. H01f 7/10

ABSTRACT OF THE DISCLOSURE

This device uses a cantilever-type vibrating member having an elliptical cross-section with the major axis of the ellipse lying in the plane of the neutral axis of the reed so that stress concentrations are reduced at the edges thereof. Radii provide a transition from the reed body to an enlarged end portion of the reed which is secured in a reed block. The radii act as stress reliefs when the reed is vibrated.

Cross references to related inventions

A patent to Mooney et al. 3,221,120 issued November 30, 1965, and assigned to the assignee of this application describes in detail the operation of a frequency responsive translating device such as is discussed in this application.

Background of the invention

This invention pertains generally to an electromechanical frequency translating device and more particularly to a balanced high shock reed used for electromechanical frequency translation.

Various problems involving frequency shifting have affected the operation of reed type electromechanical frequency translating devices. For instance, many of the miniaturized reeds are so small that they can be economically machined only on one side. Since the material from which the reeds are machined generally is cold drawn, the surfaces of the reed are prestressed. Machining the reed on one side relieves the stresses on that side but the other side remains stressed. As the reed is vibrated during use, the other side is stress relieved causing a frequency shift. Furthermore, present machining results in the reeds having a cross-section which includes sharp edges about the perimeter, vibrating the reed causes high stress concentrations to be set up in these sharp edges. If the edges become nicked or scratched, repeated high stress concentrations at these points cause fatigue fracture of the reed. Furthermore, machining from one side will also cause the reed to be non-symmetrical about its neutral axis thereby unbalancing the reed so that the effect of gravity on the vibrating reed causes additional frequency shifting.

Miniature reeds which are cantilever mounted are generally soldered or brazed to a reed block. When the reed is vibrated, the solder or brazing alloy is stressed thereby lowering the mechanical "Q" of the device and causing additional frequency shifting. For instance, if the reed is made from a material having a zero thermal expansion coefficient, temperature changes would not affect the resonant frequency of the reed. However, if the brazing alloy does not have a zero thermo-expansion coefficient, and it is stressed when the reed is vibrated so that it is a factor in determining the resonant frequency of the reed, temperature changes in the brazing alloy will cause a shift in the resonant frequency of the reed.

Summary of the invention

It is an object of this invention to provide a cantilever-type reed vibrating member that is machined on all sides so that the same are stressed relieved prior to operation of the reed.

It is another object of this invention to provide a cantilever-type reed used for electromechanical frequency translation which has a cross-section shaped to reduce high stress concentrations at the edges of the reed thereby reducing fatigue fractures.

It is another object of this invention to provide a cantilever-type reed for electromechanical frequency translation that is balanced to reduce frequency shift due to gravity.

It is a further object of this invention to provide a cantilever-type reed for electromechanical frequency translation in which frequency shifting caused by temperature changes has been greatly reduced.

It is another object of this invention to provide a cantilever-type reed for electromechanical frequency translation which has a relatively high mechanical efficiency.

In one embodiment of this invention, a reed, which is used on an electromechanical frequency responsive device, has a body portion intermediate first and second end portions of an increased thickness. The first end portion is secured in a reed block so that the reed is suspended in cantilever fashion. A second end portion supports a magnet that is responsive to an electrical signal to vibrate the reed at a predetermined resonant frequency about the reed's neutral axis. The magnet is responsive to the mechanical vibrations of the reed to induce an electrical output at a predetermined frequency. The reed body has an elliptical cross-section with the major axis of the ellipse lying substantially in the plane of the neutral axis of the body of the reed member. This, in effect, places the edges of the member in the neutral plane of the reed so that as the reed vibrates the edges of the reed are at points of zero stress concentration. The first enlarged end portion of the reed is secured by brazing to the reed block. A radius on each side of the body portion of the reed forms a transition between the body portion and the enlarged first end portion. The radii act as stress reliefs so that when the body of the reed vibrates the enlarged end portion and the brazing alloy fastening the reed to the reed block will not be stressed. The reed is symmetrical about the neutral axis so that the center of gravity of the magnet and the reed body lie on the neutral axis of the reed. Therefore, when the reed is vibrated gravity will have little affect on the vibrations thereby reducing frequency shifting due to gravity. Furthermore, the reeds are chemically machined on all surfaces to form the desired shape so that any prestressing of the metal during its manufacture will be relieved during the machining of the reeds themselves.

In the drawings:
FIG. 1 is a side elevation view partly in cross-section of the electromechanical frequency translating device of this invention. Shown in dotted lines in this figure is the flexed position of the device during vibration;
FIG. 2 is a top plan view of the device of FIG. 1;
FIG. 3 is a cross-section taken along the lines 3—3 of FIG. 2;
FIG. 4 is a side elevation view partially in cross-section of a prior art electromechanical signal translating device. Shown in dotted lines in this figure is the flexed position of the device during vibration;
FIG. 5 is a top plan view of the prior art device of FIG. 4; and
FIG. 6 is a cross-section taken along the line 6—6 of the prior art device of FIG. 5.

Detailed description

In the drawings, cantilever-type reed 10 for use in an electromechanical frequency responsive device is shown greatly enlarged to make the details of the construction more easily understood. In devices actually constructed in which this type of reed may be used, the maximum dimension is on the order of one inch. Referring now more particularly to the drawing, the reed 10 is secured by brazing to a reed block 12. Reed 10 has an increased thickness at the end 14 which is fixed in the reed block and at the free end 16 so that the required strength is provided at the ends of the body portion 18 of the reed. The reed is designed so that it is resonant at some predetermined frequency.

Free end 16 of the reed has an elongated cylindrical permanent magnet 20 mounted therein. The magnet 20 extends through a hole in the free end 16 of the reed 10 and is mounted transversely thereof. The magnet serves as an armature for both driving and sensing the vibrations of reed 10 at the resonant frequency.

A pair of inductance windings 22 and 24 are mounted in a suitable fashion for driving and sensing vibrations in reed 10. Electrical signals at a predetermined frequency when applied to coil 24 displace the magnet to drive the reed into vibration, the second coil 22 senses the mechanical vibrations of the reed to produce electrical signals at a predetermined frequency. These electrical signals may be used in a feedback circuit to sustain oscillations, as in a selected signal transmitter, or in another application they may be used to open a selected signaling receiver circuit to reproduce a transmitted signal accompanying signals of a predetermined frequency. For a more detailed description of an electromechanical frequency translating device which operates using these principles, one may refer to a patent to Mooney et al., 3,221,120, issued Nov. 30, 1965.

The reed member 10 in accordance with this particular embodiment was chemically machined from both sides of a strip of Ni Span C nickel alloy which is a trademark of International Nickel Corporation. In one example, an 8 x 12 inch strip .014 to .015 inch thick was used from which a great number of reeds were made. The reed member 10 was made approximately .625 inch long by .003 inch thick at the body portion 18, with the end portions 14 and 16 being .092 inch wide and having a thickness equal to the thickness of the sheet. By being able to chemically machine the reeds from both sides of the sheet material certain geometric configurations are available which were not feasible prior to chemical machining. It should be clear, of course, that the dimensions given for this particular embodiment are for illustrative purposes only and are not meant to limit the application in any manner.

Referring more closely to FIG. 1, it can be seen that fillets or radii such as 30, 31 and 34, 35 (FIG. 2) form a transition between the body portion 18 of the reed 10 and the enlarged portion 14 at the fixed end of the reed 10. Furthermore, by machining the reed from both sides of the original flat plate, a cross-section is obtained which is elliptical in configuration as shown at 38 in FIG. 3. The ellipse 38 has a major axis 40 which lies in the plane containing the neutral axis or center line 42 (FIG. 1) of the reed 10. In addition the reed is machined so that the enlarged portion 16 at the free end is symmetrical about the center line 42. Therefore, the center of gravity of the reed 10 and the magnet 20 as shown at 45 lies on the neutral axis 42 of the reed 10.

The significance of this structure can be more clearly understood by referring to FIGS. 4–6 which illustrate a reed device made under previously used mechanical machining methods. In making these devices a flat sheet of metal is machined from one side to make the thin body portion 50 which is intermediate the enlarged fixed end portion 52 and free end portion 54. In this device, fillets on one side only, such as shown at 55, form the transition from the thin body portion 50 to the fixed end portion 52 of the reed. Because the other side is not machined, the transition is flat surface 51 from the body portion 50 to the end portion 52. Equally significant is the fact that the cross-section of the body portion 50 as shown in FIG. 6 is a rectangle 58. Finally, the reed is not machined symmetrical about the neutral axis 60 of the reed device so that the center of gravity 62 of the reed and magnet 64 is offset from the neutral or center line 60.

It should be apparent to those skilled in the art that the greater the distance from the neutral axis 60 the greater the stress level within the body portion 50. By referring to FIG. 6 such as at 65 it can be seen that the greatest stress concentrations in the prior art device are at the four sharp edges of the rectangular cross-section 66 for instance. This is undesirable because any notches or scratches at these sharp edges will be subjected to maximum stress during operation of the device and will eventually cause a fatigue fracture with subsequent failure. Referring to the elliptical cross-section 38 of the reed 10, however, one can see how this problem has been alleviated. By making the cross-section elliptical in shape and placing the major axis of the ellipse in the plane of the center line 42 of the reed 10, the two sharp edges 70 and 72 of the body portion 18 lie on the neutral axis of the reed 10 and therefore theoretically at points of zero stress during the time that the reed is being vibrated, and the maximum stress levels fall on the smooth curved outer surface. Therefore, notches or scratches or nicks at the edges will not eventually result in fatigue failure of the reed device. Because all stress concentrations at the edges of the device have been virtually eliminated, the fatigue life of the reed device has been greatly extended.

Referring once again to the prior art device, because the body portion 50 was machined so that there were fillets on only one side such as 55, when the reed is excited into vibration as shown by 53, the outer fibers on the opposite side of the reed at 51 are elongated stressing the brazing alloy 68 which is used to secure the end 52 to the reed block 70. The stress on the brazing alloy 68 is a factor which contributes to the resonant frequency of the overall device. It is possible to select the reed material to have a constant thermal expansion coefficient so that the resonant frequency will remain the same for temperature variations. However, the brazing alloy has poor temperature characteristics and because the alloy is a factor in the resonant frequency of the device, temperature changes in the alloy will cause the frequency of the device to shift. In the reed 10 of this invention, however, by machining the reed on both sides so that the fillets 30, 31 and 34, 35 form a transition from the thin body portion 18 to the enlarged fixed end 14 this problem has been eliminated. When the reed 10 is vibrated to a position shown in phantom at 72, the fillets or radii act as stress reliefs so that relatively little or no stress is applied to the brazing alloy 74. Therefore, the brazing alloy will have very little effect on the resonant frequency of the reed 10 so that temperature changes will have little affect on the frequency, providing the reed is made of a material that has a constant thermoexpansion coefficient. By relieving the strain to reduce the affect of the brazing alloy on the resonant frequency of the reed, the mechanical efficiency or Q of the device is improved, mainly, because the Q of the reed is generally greater than the Q of the brazing material.

Because the metal sheets from which the reeds are made are usually cold drawn both sides of the sheet material are pre-stressed. In the prior art device, machining on one side of the plate to form the reed configuration reduces the stress level on that side. However, the unmachined side of the reed still remains stressed. After the reed has been in operation for sometime, the vibrations relieve the stress on the unmachined side causing a frequency shift. In the reed device 10 of this invention, however, by chemically machining the reed on both sides the residual stress levels are lowered to a point that frequency shift due to time of operation of the device is almost completely eliminated.

Machining the prior art reed only on one side also causes the center of gravity 62 to be offset from the neutral axis 60 of the reed. This causes the reed to become unbalanced so that as the reed vibrates gravity will act on the free end 54 to cause some frequency shifting due to gravity. By making the free end 16 of the reed 10 symmetrical about the neutral axis, the center of gravity 45 of the reed and magnet falls in the plane of the neutral axis 16. Therefore, the reed is balanced so that as it vibrates gravity will have little or no affect on the resonant frequency of the device 10 so that frequency shift due to gravity is virtually eliminated.

What has been described, therefore, is a highly efficient, temperature stable cantilever type reed for electrical and mechanical frequency translation which is shaped to reduce high stress concentrations on the edges of the reed to reduce fatigue fractures, and which is balanced to reduce the frequency shift due to gravity.

I claim:

1. An electromechanical frequency responsive device including in combination, a vibrating member comprising a body portion having a cross-section with sharp edges, all said sharp edges being positioned at the neutral axis of the vibrating member to relieve stress concentration at said edges of said body portion with the member being vibrated, said member further including first and second end portions, means securing said first end portion thereby suspending said vibrating member in a cantilever fashion, means coupled to said second end portion and being responsive to an electrical signal for vibrating said member at a predetermined frequency.

2. The electromechanical device of claim 1 wherein said cross-section of said body portion is an ellipse, said ellipse having the major axis thereof lying in the plane of the neutral axis of said vibrating member thereby reducing stress concentration at the edges of said member.

3. The electromechanical device of claim 1 further including fillets forming a transition between said body portion of said member and said first end portion, said stress relieving means reducing the stressing of said securing means with said member being vibrated thereby reducing frequency shift and improving the efficiency of the device.

4. In an electromechanical frequency responsive device comprising a reed member having a body portion intermediate first and second end portions of an increased thickness, with the first end portion being secured so that the reed is suspended in a cantilever fashion, and the second portion supporting a magnet that is responsive to an electrical signal to vibrate the reed at a predetermined frequency about the neutral axis thereof, the magnet being further responsive to the vibrations of the reed to induce an electrical output at the predetermined frequency, the improvement comprising, the reed body having an elliptical cross-section with the major axis of the ellipse lying substantially in the plane of the neutral axis of the body of the reed member thereby reducing stress concentration at the edges of the member.

5. The electromechanical device of claim 4 wherein said first end portion is secured by brazing the same to a reed block, and the improvement further comprises a plurality of fillets forming a transition between the body portion of the reed and the first end portion, said fillets acting as stress reliefs to make the frequency of vibration of the reed independent of the brazing metal connecting the first end portion to the reed block.

6. The electromechanical device of claim 4 further including the reed and the magnet coupled to the second end portion having a center of gravity lying in the plane of the neutral axis of the reed to reduce frequency shift caused by gravity acting on said second end portion with the reed being vibrated.

7. The electromechanical device of claim 4 further including the reed member having stress-free surfaces to reduce frequency shift due to the relieving of residual stresses by operation of the device.

References Cited

UNITED STATES PATENTS 3,221,120    11/1965    Mooney et al. _____ 335—90

FOREIGN PATENTS 369,558    3/1939    Italy.

GEORGE HARRIS, Primary Examiner.

U.S. Cl. X.R.

335—93